Oct. 5, 1948.  J. G. HERRMANN  2,450,661
CONFECTIONERY COATING APPARATUS
Filed June 4, 1948

INVENTOR.
JOHN GEORGE HERRMANN
BY
ATTORNEY

Patented Oct. 5, 1948

2,450,661

UNITED STATES PATENT OFFICE 2,450,661

CONFECTIONERY COATING APPARATUS

John George Herrmann, Baldwin, N. Y., assignor to Conveyor and Machinery Manufacturers, Inc., New York, N. Y., a corporation of New York Application June 4, 1948, Serial No. 31,195

14 Claims. (Cl. 107—1)

This invention relates to a confectionery coating apparatus, more particularly to a device adapted to coat and otherwise process frozen confections with handle sticks, such as those that are popularly known as "pops."

In the conventional method of applying shredded, granulated or powdered coatings upon frozen confections of the class mentioned, it has heretofore been necessary to perform certain operations manually, each unit being separately handled. For example, in the coating of frozen pops with almond, cocoanut or peanut particles, each pop, after removal from the freezer and defrosting, is individually dipped into an edible liquid binding agent, such as peanut oil. Since such binding agents generally freeze quickly and thereafter become ineffective, it is imperative that the coating operation be performed before such freezing takes place. And inasmuch as the afore-mentioned coating material is solid rather than liquid, there can be no dipping process, the most practical method being to roll the peanut-oil-covered frozen confection in the powdered, shredded or granulated coating material. Is has heretofore been found that the most effective method of performing this rolling operation is by hand. Accordingly, the practice has been, and still is, for each operator individually to pick up a pop, dip it into peanut oil, and quickly roll it over the coating particles. This being the last operation, there is no alternative but to pack each coated pop individually into bags—a slow and costly process.

It is primarily within the contemplation of this invention to provide a coating apparatus whereby confections, particularly frozen confections like pops, can be coated with solid particles, such as almond, cocoanut, peanut or other products, on a production basis. More specifically, it is an object of this invention to provide means for assembling a plurality of confections on a suitable rack, preferably of the type employed in the freezing of pops, and cooperatively using said loaded rack with the apparatus of my invention whereby all the confection units will be quickly coated with the desired material, and whereby the entire holding rack can be withdrawn for placement upon a belt conveyor to envelope the pops with suitable bags, on a mass production scale.

It is a further object of my invention to provide means for effecting an even distribution of the coated material over each of the confection units being processed.

Another object is to provide a device, simple in construction and easy to operate, capable of performing each of the objectives above mentioned.

Other objects, features and advantages will appear from the drawings and the description hereinafter given.

Referring to the drawings.

Figure 1:
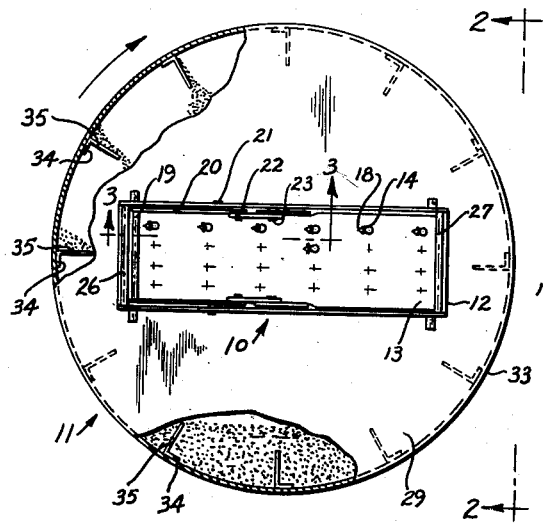
Figure 1 is a front view of the rack operatively assembled to the drum member, in accordance with my invention, fragments of the front wall of the drum being broken away to show the coating particles therein.
Figure 2:
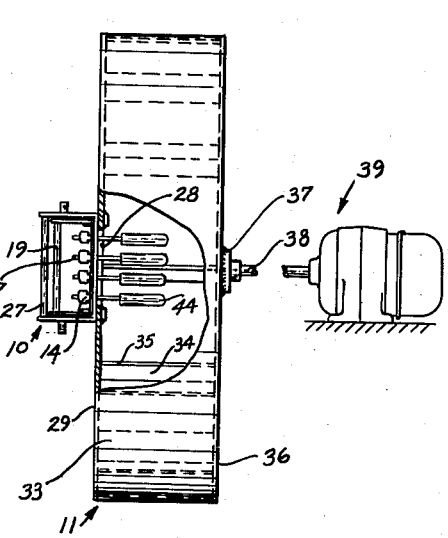
Figure 2 is a side view of Fig. 1, looking in the direction of line 2—2, the pops secured by the rack being shown operatively in place, a fragment of the drum being removed for clarity.

In the preferred apparatus for practicing the method of my invention as illustrated in the drawings, there are two main elements, the releasable "pop"-holding rack 10 and the rotatable drum 11, the rack 10 being adapted to support the stems 17 of a plurality of pops or other frozen confections, and to be operatively attached to the drum member 11 in a manner whereby the confections will be disposed within the drum, all in a manner to be more clearly hereinafter set forth.

Figure 3:
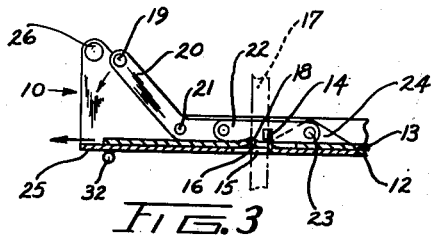
Figure 3 is a fragmentary enlarged sectional view of the rack, taken substantially along line 3—3 of Fig. 1, and in its holding position, and showing, in dot-dash lines, a stem being operatively held in place.
Figure 4:
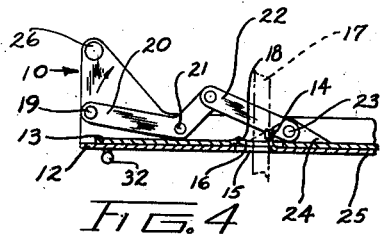
Figure 4 is a view like Fig. 3, but showing the rack in its released condition.

The said rack or holder 10 may be of any conventional construction, the drawing illustrating a device consisting of a front stationary plate 12 and a rear slidable plate 13, each of said plates having a plurality of apertures therein, the apertures of one plate being in variable registry with those of the other, whereby the stems of the frozen confections may extend through and be supported by the coacting apertured portions of the two plates. In the construction illustrated the front plate 12 has pressed rearwardly therefrom a plurality of retainer walls 14, there being a wall for each of the apertures 15 of the front plate. These walls extend rearwardly through the apertures 16 in the rear plate 13, and are so proportioned as not to interfere with the slidable movement of the rear plate with respect to the front plate. Said rear plate is slidably movable from a retracted or releasing position (Fig. 4) to a projected or holding position (Fig. 3). In the said releasing position, the portions of the said front and rear apertures that are in registry are in their maximum open positions; whereas in the said holding position, the portions of the front and rear apertures that are in registry are in their minimum open positions, so as to frictionally accommodate therein the said stems 17 of the frozen confections to be treated. As will be observed from the drawings, when the said stems are disposed within the said apertures of the front and rear plates, they are firmly held in place by the clamping action of the said retainer walls 14 and the oppositely disposed portions 18 of the inner wall apertures 16. When said rear plate 13 is operatively retracted to its releasing position, the clamping action will no longer be in effect, and the stems of the pops can readily be withdrawn rearwardly from said apertures. The operative movement of the said rear plate 13 is effectuated by manually actuating the side handle bar 19 forwardly, whereby the lever 20, pivotally mounted at 21, will cause a pivotal retraction of arm 22 the terminal 23 of which is pivotally mounted upon the flange 24 of the rear plate 13. The action above mentioned will cause a slidable movement of said rear plate 13 to the left (Fig. 4), to enlarge the effective openings of the apertures in registry.

This invention is not limited to the particular type of rack or holding device above described; but it is nevertheless required that the holding device, of whatever construction, contain a flat front operative surface 25 with a plurality of apertures adapted to frictionally accommodate the said stems 17 of the frozen confection with the frozen edible portions thereof disposed forwardly of said surface 25. And it is also required that there be handle means, such as the side bars 26 and 27, to enable the rack 10 to be readily and conveniently grasped and moved manually.

The drum member 11 contains an aperture 28 in the front end wall 29 thereof, the proportions of said aperture being sufficient to receive therethrough confections operatively supported by the holder 10. In other words, the periphery of aperture 28 should be proportioned so as to surround all the apertures 15 and 16 of the said front and rear plates 12 and 13. The said front wall 29 also contains therein the four spring clips 31, adapted to receive the lugs or extensions 32 on the face 25 of the said plate 12. The arrangement is hence such that when the holder 12 is brought into its operative position with respect to the drum 11, the said lugs 32 will be frictionally engaged by the clips 31, the face 25 of front plate 12 will be flush with the front wall 29 of the drum 11, and the pops supported by the holder 10 will extend into the said drum 11.

Secured to the inner surface of the cylindrical wall 33 of the drum are a plurality of circumferentially spaced angle bars 34 having radially extending shelves 35. In the preferred construction these shelves extend longitudinally along said cylindrical wall 33, between front wall 29 and rear wall 36.

Figure 5:
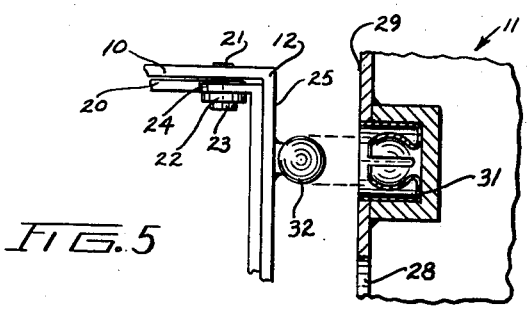
Figure 5 is a fragmentary enlarged, partial sectional view of the rack and drum of Fig. 2, but shown in disassembled relation, and illustrating the spring clip for holding the rack in place.
Figure 6:
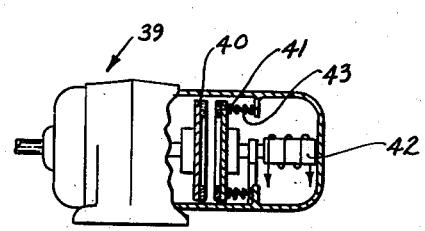
Figure 6 is a partial elevation and partial sectional, semi-schematic view, of the motor and brake arrangement for use with my invention.
Figure 7:
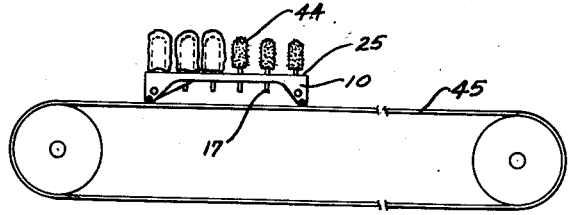
Figure 7 is an elevational view showing a conveyor belt and a rack with coated confections placed thereon, some of the confections being covered with envelopes.

Attached to the rear end wall 36 of the drum 11 is the boss 37 which carries shaft 38, operatively connected to the motor 39. In the preferred method of practicing my invention, this is a brake type of motor schematically illustrated in Fig. 5 in which a rotary disc portion 40 is engageable with a stationary disc portion 41 operatively connected to the solenoid 42, a spring 43 normally urging the disc 41 into braking engagement with disc 40. Upon the normal operation of motor 39, the solenoid 42 retracts the disc 41, whereby it is out of engagement with the disc 40; but as soon as the motor circuit is opened, the solenoid 42 becomes inoperative in known manner, and the relatively powerful spring 43 presses disc 41 into engagement with disc 40 and quickly stops the motor. In other words, the arrangement is such that there can be a relatively sudden stoppage of the rotating drum 11, for reasons which will more clearly hereinafter appear. It is to be understood that this invention is not limited to the specific type of brake motor herein described, inasmuch as other known stop mechanisms may be employed with equal force and effect.

In operatively employing this apparatus, the first step is to place suitable quantities of the desired coating material upon the said shelves 35. Powdered, shredded or granulated almond, peanut, cocoanut or other coating material is inserted through opening 28 in the drum, so that they will be deposited upon the said shelves of the rotating drum, substantially as indicated in Fig. 1. The stems 17 are then secured to the holder 10, being frictionally engaged by the apertures thereof in the manner aforesaid.

Then, in conventional manner, the rack is brought to a freezer and the stems placed in a multi-cellular mould containing soft cream, whereafter the device is removed for defrosting. Now, instead of following the conventional practice of releasing the pops for individual processing, in the manner above mentioned, the holder is manually lifted and the frozen portions or heads 44 are dipped into peanut oil, or some other suitable liquid binder. Immediately thereafter the entire rack is secured to the wall 29 of the drum, with the heads of the pops disposed interiorly thereof, in the manner aforesaid. The motor 39 is then started, causing the drum to rotate. During such rotary movement of the drum, particles of the coating material are carried upwardly by the shelves 35, and as the shelves reach levels above the centrally disposed rack 10, the particles will slide off the walls 35 to be deposited upon the outer surfaces of the pops 44. Since there are a number of spaced shelves 35 disposed about the cylindrical wall 33, there will be in effect a continuous shower of the coating particles upon the pops on the rack, from all directions. It has been found that with suitable speeds, a quick coating of all pops is effectuated, particularly when they are arranged in a plurality of parallel rows in the manner illustrated.

After a predetermined revolution of the drum, the motor is suddenly stopped. This causes excess quantities of the coating material to be shaken off, leaving only a layer adjacent the frozen surface of the pop. It has been found that the time interval between the first deposit of coating particles upon the pops and the end of the process can be accurately predetermined so as to cause an adherence to the pop of a desired layer of coating material, whereby all further deposits can readily be shaken off by the sudden stoppage of the device.

Thereafter the entire rack is withdrawn from the drum, ready for wrapping within bags. As illustrated, the rack 10 is turned face up and placed upon the conveyor belt 45 which will carry the pops between rows of operators who can readily envelop the pops in bags or other wrapping means. When the rack is removed from the conveyor, and the pops operatively released therefrom, all of them are properly coated and wrapped ready for use, without the use of individual handling.

It is thus apparent that by the use of this device, and the method of my invention, a conventional freezing system may be employed for obtaining a plurality of frozen confections by dipping releasably held stems in a multi-mould freezer. However, instead of releasing the frozen confections, after the defrosting operation, for individual coating and wrapping, my invention enables the rack with the frozen confections to be mechanically coated with solid particles of coating material, without the need of employing individual hand-rolling operations. And since the coated pops or frozen confections are, after the coating operation, operatively held in the rack, the operation of placing bags or other wrappings over the completed pops can be effected on a belt conveyor assembly line.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

I claim:

1. An apparatus for covering, with a coating of solid particles, frozen confections and the like having stems extending therefrom, comprising a rack, a rotatable drum, and a motor connected to the drum; the said rack having a plurality of retainer walls for releasably holding said stems with the confection portions disposed forwardly of the rack; the said drum having a peripheral wall and two end walls, one of said end walls containing an aperture, the peripheral wall having a plurality of spaced inwardly extending shelves disposed along the inner surface thereof; the rack being detachably connected to the said end wall having the aperture with said retainer walls adjacent and in substantial registry with said aperture, whereby the confections extend through the aperture and are disposed within the drum.

2. An apparatus according to claim 1, further provided with a quick-acting brake operatively connected to the drum, whereby a sudden operative application of the brake will cause a stoppage of drum's rotation and a shaking off of excess coating material deposited on the confections during the operation of the apparatus.

3. An apparatus according to claim 2, the motor having a rotor, the brake having two operatively adjacent coacting brake discs, further provided with an electro-mechanical member electrically connected to the motor, one of said discs being attached to the rotor and the other to said electro-mechanical member, said last-mentioned member being operatively movable between two limiting positions, one at which the said brake discs are in operative engagement and the other at which they are in spaced relation.

4. An apparatus according to claim 1, the rack containing a flat face plate, the retainer walls extending rearwardly therefrom, the said apertured end wall of the drum having in the region surrounding the aperture an outer flat surface with which the flat face plate is abuttable when the rack is operatively connected to the drum, whereby a closure is formed for the aperture.

5. An apparatus according to claim 1, the said peripheral wall of the drum being cylindrical, the said shelves being circumferentially spaced upon the inner surface of the cylindrical wall and extending inwardly substantially radially.

6. An apparatus according to claim 1, the said shelves extending longitudinally between said end walls and substantially parallel to the axis of the drum.

7. An apparatus according to claim 1, the rack containing a flat face plate, the retainer walls extending rearwardly therefrom, the said apertured end wall of the drum having in the region surrounding the aperture an outer flat surface with which the flat face plate is abuttable when the rack is operatively connected to the drum, whereby a closure is formed for the aperture, and coacting spring holders on the apertured wall of the drum and the face plate of the rack, for yieldably holding the rack to the drum.

8. An apparatus according to claim 1, the end wall opposite the said apertured wall of the drum being connected to the motor, and a brake operatively associated with the motor.

9. In an apparatus for covering, with a coating of solid particles, confections and the like having stems, extending therefrom, a rack, a rotatable drum for the coating material, and a motor connected to the drum; the said rack having a plurality of retainer walls for releasably holding said stems with the confection portions disposed on one side of said walls, the drum having an aperture in a wall thereof, the rack being detachably connected to the drum with the retainer walls adjacent and in registry with said aperture, whereby the confections extend into the drum.

10. In an apparatus for covering, with a coating of solid particles, confections and the like having stems extending therefrom, a rack for holding said stems with the confection portions disposed on one side thereof, a rotatable drum for the coating material, and a motor connected to the drum; the drum having a peripheral wall and a plurality of spaced inwardly extending shelves disposed along the inner surface of the peripheral wall; the drum being further provided with an apertured portion, the rack being attached to the drum adjacent said apertured portion, whereby the stems operatively supported by the rack will extend through the apertured portion and the confection portions will be disposed within the drum.

11. In an apparatus for covering, with a coating of solid particles, a group of confections and the like, a rotatable container for the coating material, means for mounting the confections in fixed mutual relation within the container, and means for rotating the container and group of confections as a unit, whereby the coating material within the container will be deposited upon the confections.

12. In an apparatus for covering, with a coating of solid particles, a group of confections and the like, the combination according to claim 11, further provided with a quick-acting brake operatively connected to the container, whereby a sudden operative application of the brake will cause a stoppage of the container's rotation and a shaking off of excess coating material deposited on the confections during the operation of the apparatus.

13. In an apparatus for covering, with a coating of solid particles, a group of confections and the like, a rotatable container for the coating material, means for mounting the confections within the container, and means for rotating the container and group of confections as a unit, whereby the coating material within the container will be deposited upon the confections.

14. In an apparatus for covering, with a coating of solid particles, a group of confections and the like, a movable container for the coating material, a support on the container for mounting the confections within the container, and means for moving said container and said group of confections as a unit, whereby the coating material will be deposited upon the confections.

JOHN GEORGE HERRMANN.

REFERENCES CITED

The following references are of record in the file of this patent:

UNITED STATES PATENTS

| Number    | Name        | Date          |
|-----------|-------------|---------------|
| 1,876,224 | Harding     | Sept. 6, 1932 |
| 1,908,539 | Quick       | May 9, 1933   |
| 2,138,297 | Ekert et al.| Nov. 29, 1938 |
| 2,248,643 | Rasmusson   | July 8, 1941  |